J. O. TWINBERROW.
LOAD EQUALIZER FOR VEHICLE SPRINGS.
APPLICATION FILED DEC. 6, 1919.

1,373,109.

Patented Mar. 29, 1921.

Inventor
James O. Twinberrow
By *Featherstonhaugh*
Att'ys

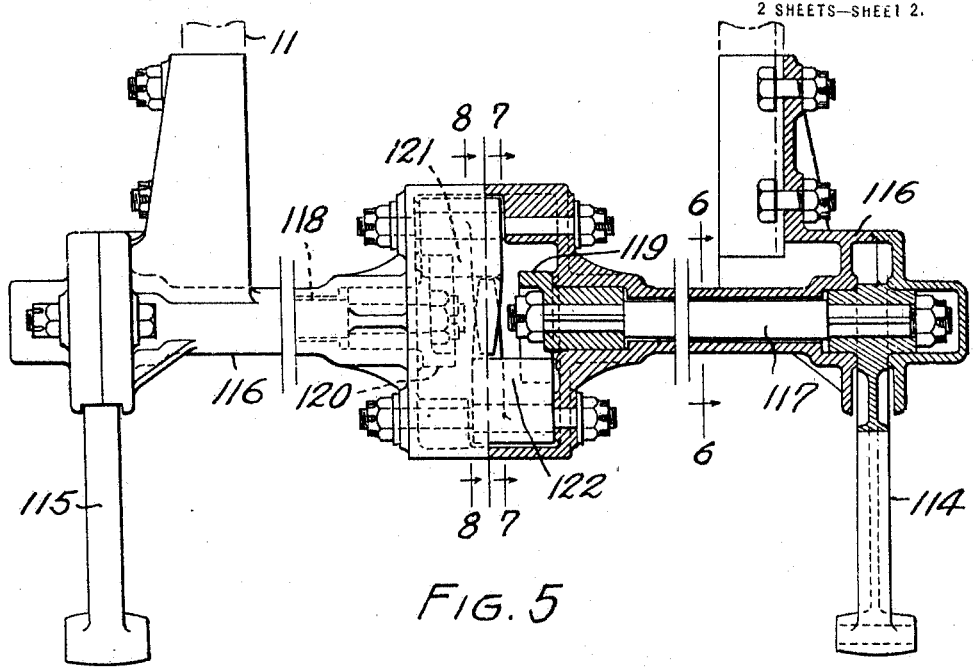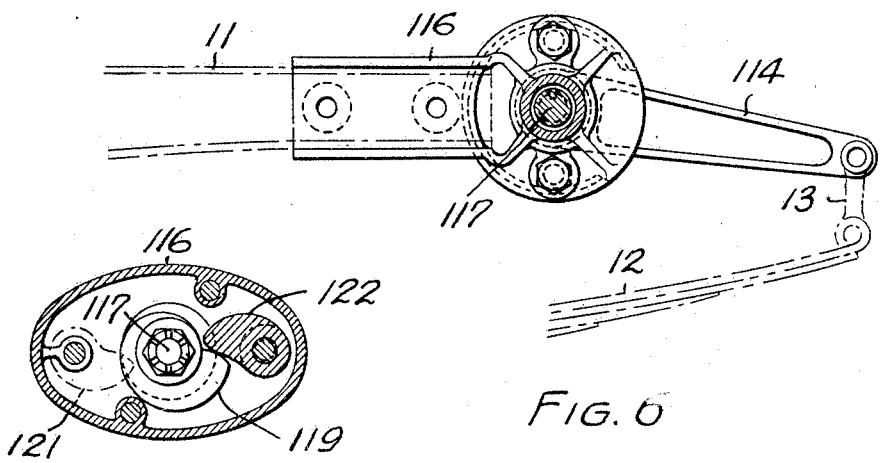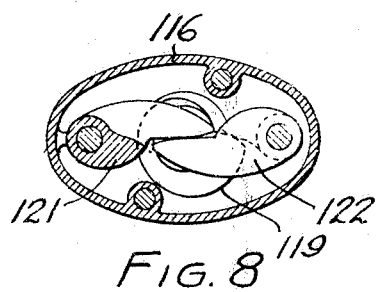

UNITED STATES PATENT OFFICE.

JAMES O. TWINBERROW, OF MONTREAL, QUEBEC, CANADA.

LOAD-EQUALIZER FOR VEHICLE-SPRINGS.

1,373,109.  Specification of Letters Patent.  Patented Mar. 29, 1921.

Application filed December 6, 1919. Serial No. 342,904.

*To all whom it may concern:*

Be it known that I, JAMES O. TWINBERROW, a subject of the King of Great Britain, and resident of the city of Montreal, in the Province of Quebec and Dominion of Canada, have invented certain new and useful Improvements in Load-Equalizers for Vehicle-Springs, of which the following is a full, clear, and exact description.

This invention relates to improvements in shock absorbers and equalizers for motor vehicles, and the object of the invention is to provide means for equalizing the load on the rear springs and thereby utilizing one rear spring to absorb shock imparted to the other spring.

The advantage of a three-point suspension for the motor and transmission is well recognized and is used in most cars. The advantage of such a suspension for the chassis itself is so evident that it is sought to be adopted in some of the later cars. The only method at present in use by which a three-point chassis suspension can be approximately obtained is by the use of a transverse rear spring. This fails to give completely satisfactory results, as the rear spring is rigidly fastened to the chassis frame and has very little equalizing effect. The unsatisfactory condition under which the four-point suspension operates is proven by the broken and twisted or loose-jointed chassis of cars which have seen hard usage and also by the great variety of shock absorbers in use.

The weight of a car body is equally divided between the four springs only when the vehicle is on a plane surface. In ordinary usage, this is a comparatively rare occurrence. When a depression or rut in the road is encountered, one of the wheels momentarily loses contact with the road, with the result that the spring adjacent this wheel carries none of the weight of the body, which is therefore supported entirely by the three remaining springs. In service, this results in constant twisting stresses applied to the chassis. In addition to this there is a very destructive action which takes place in the transmission. When one of the rear wheels loses contact with the ground or does not take its full share of load, the action of the differential gear is to speed up that wheel, with the result that when it again strikes the road or takes full load a very considerable shock is given to the whole transmission.

A three-wheel chassis overcomes the above disadvantages but is not a practical structure.

This invention provides for a four-wheeled chassis with four springs and all the advantages of a three-point suspension. This result is obtained by providing a cross connection between the rear springs, so arranged that if one rear wheel, for example, the left hand wheel is relieved of load the extra load imposed on the right hand wheel and spring is transferred through the connection to the left hand spring and also operates to force the left hand wheel against the road until it takes its full share of load. In other words, as one spring flattens the other spring is flattened until the load is equalized between the two springs. This flattening of the spring is accomplished in a manner to force the wheel adjacent it against the road and compels it to take its proportionate share of load. In an ordinary construction the rear axle oscillates about centers which are substantially the longitudinal axes of the springs, whereas the mechanism according to this invention causes the axle to oscillate about a center located intermediate the two springs. While there is no actual center connection between the axle and chassis frame the result is the same and the mechanism produces in effect a three-point suspension. Obviously the equalizing of load on the wheels prevents the shocks due to sudden speed variation noted heretofore.

According to this invention the springs are connected to the chassis frame through links and levers, the levers on opposite sides of the frame being connected by an arrangement of shafts and opposed cams which force either lever when moved by spring flexion to move the other lever and flex the other spring. The formation of these cams may be such as to produce a constant ratio of angular movement of the levers or a regularly or irregularly increasing or decreasing ratio of movement with a consequent constant, decreasing or increasing rate of transference of load from one spring to the other. The terms "lever" and "cam" are used for convenience of description but it will be understood that "cams" of the profiles shown in the drawings are substantially levers.

In the drawings which illustrate the invention:—

Fig. 5 is a view similar to Fig. 1, illustrating a slightly modified form.

Fig. 6 is a section on the line 6—6, Fig. 5.

Fig. 7 is a section on the line 7—7, Fig. 5.

Fig. 8 is a section on the line 8—8, Fig. 5.

Figure 1:
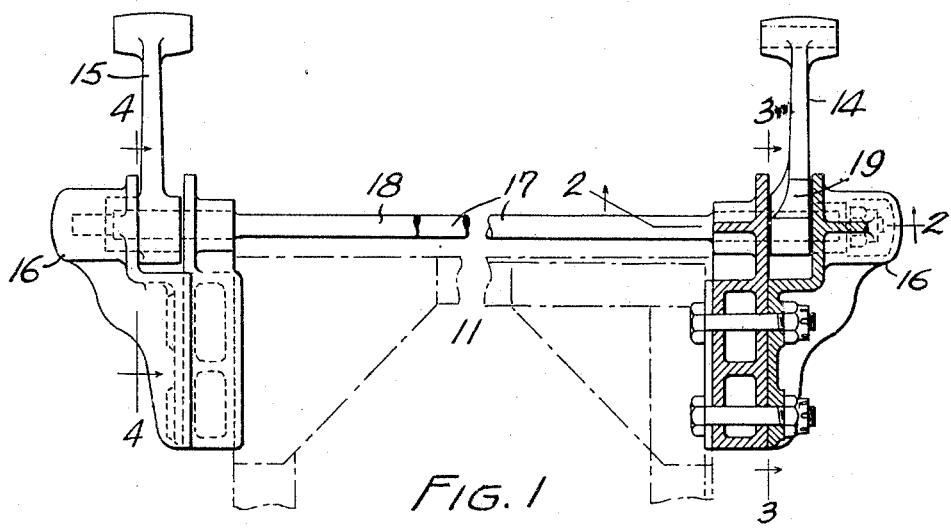
Figure 1 is a view of the device half in plan and half in horizontal section.
Figure 2:
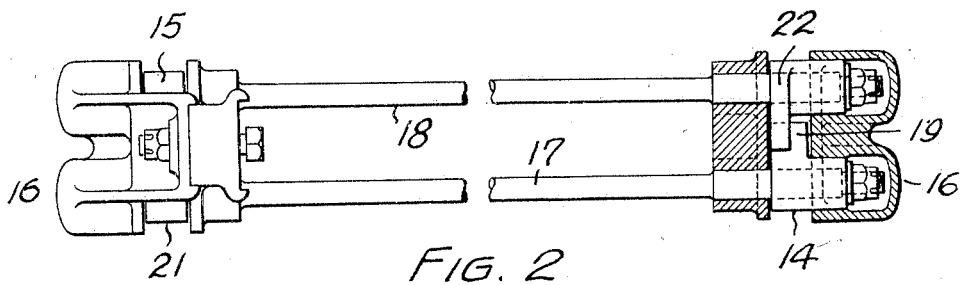
Fig. 2 is a view half in front elevation and half in section on the line 2—2, Fig. 1.
Figure 3:
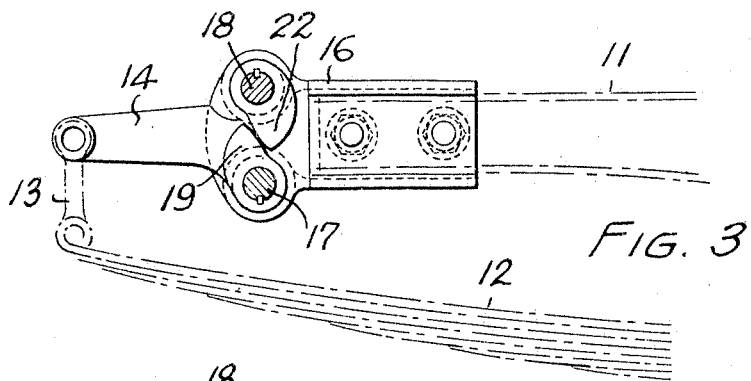
Fig. 3 is a section on the line 3—3, Fig. 1.
Figure 4:
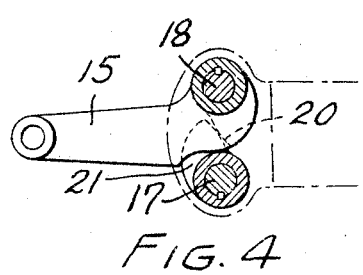
Fig. 4 is a section on the line 4—4, Fig. 1.

Referring to the drawings, and more particularly to Figs. 1 to 4 thereof, 11 designates the chassis frame of a motor vehicle and 12 the rear springs which may be either semi-elliptic or cantaliver. The rear ends of the springs are connected by links or shackles 13 with the free extremities of levers 14 and 15 pivotally mounted in housings 16 secured to the chassis frame 11. A pair of shafts 17 and 18 extend transversely of the car from side to side and are preferably located one above the other. These shafts may be of either hard or spring steel as desired. The lever 14 is irrevolubly attached to an end of the shaft 17 and the other lever to the opposite end of the shaft 18. The levers are located in a single horizontal plane midway between the shafts, so that one lever curves upwardly and the other lever downwardly to the shaft to which it is attached. The levers 14 and 15 may be provided respectively with lateral extensions forming cams 19 and 20, or these may be separate from the levers. It will be noted that the extremity of the cam 19 lies between the shaft 17 and the end of the lever, whereas the tip of the cam 20 lies across the shaft 18 from the lever end. The remaining ends of the shafts are provided with irrevoluble cams 21 and 22 which are normally in engagement with the cams 19 and 20 respectively. The levers 14 and 15 are provided with recesses 23 to receive the hubs of the cams 18 and 21 respectively, the depth of these recesses limiting lever movement.

The form of device shown in Figs. 5 to 8 inclusive differs from the form already described in that the shafts do not each extend across the vehicle but are arranged in alinement. This alteration of the shaft disposition imposes a slight alteration in the construction of the levers and cams. In this construction the levers 114 and 115 are connected to the springs in the manner described and are journaled in housings 116 secured to the chassis frame. The levers 114 and 115 are irrevolubly connected respectively to the shafts 117 and 118 which extend transversely of the vehicle in alinement. The housings 116 differ in this form of the invention from that previously described in that they meet preferably in the center line of the vehicle and inclose the shafts 117 and 118 and the remainder of the mechanism. The inner or adjacent ends of the shafts 117 and 118 are provided with irrevolubly mounted cams or levers 119 and 120. The hubs of which act as bearings for the shafts. These cams are located in the meeting portions of the housings which are suitably enlarged for the purpose. Cams or levers 121 and 122 are pivotally mounted within the housings between the ends of the shafts and are formed to engage with one another and with the cams 119 and 120.

The operation of the device shown in Figs. 1 to 4 inclusive is extremely simple. If the wheels of a car are supporting unequal portions of the load the springs adjacent the wheels are also unequally loaded and one spring, therefore, tends to flatten more than the other. This flattening causes an upward movement in the free extremity of the spring which is connected, say, to the lever 14 and oscillates the lever so that the cam 19 presses against the cam 22 and produces revolution of the shaft 18. The opposite end of this shaft is attached to the lever 15 and therefore the lever is rocked. The lever 14, being fixed to the shaft 17, revolves the shaft so that the cam 21 on the opposite end thereof presses against the cam 20 on the lever 15 and rocks the lever. It will thus be seen that force is transmitted between the levers through two channels. It will readily be seen that the arrangement of cams is the equivalent of gear connection between the shafts in that the shafts revolve in opposite directions, with the result that the upward swing of the lever 14 produces a downward swing of the lever 15. This downward movement of the lever 15 is communicated to the spring connected to it and depresses the spring forcing the wheel under the spring against the road. This depressing action will continue until both wheels and springs are supporting equal loads and an equilibrium is established so that no further movement occurs. This action continues in a greater or lesser degree all the time the vehicle is in motion and compels the springs to carry equal loads regardless of the vertical movement of the wheels. Obviously the cam pairs must be matched on opposite sides of the vehicle. When the device is normal the contacting points of cams having the profiles shown are substantially midway between the shaft centers but when angular movement occurs this point of contact moves away from the shaft initiating the movement or driving shaft so that the angular movement of the other or driven shaft is greater than the angular movement of the driving shaft and therefore the lever connected to the unloaded spring is moved through a larger angle so that the action of pressing the wheel against the road and loading the spring is effected very quickly. It is obvious that by using cams of different profiles the ratio of angular movement between the shafts may be arranged to suit the service conditions under which the device will operate. If the cams are formed to keep the contact point exactly half-way between the shafts the ratio of shaft movements will be constant. By substituting cams of still other profiles the contact point may be made to approach the driving shafts in place of recede from it as shown in the drawings, so that the movement imparted to the unloaded spring will be less than the movement of the overloaded spring and the shaft movement will be in a decreasing ratio. It will be obvious that the increase or decrease in the ratios of movements may be either regular or irregular, as desired, by appropriate shaping of the cams. From this it will be seen that the successful operation of the device depends very largely upon the selection of cams which will produce an action suitable for the service. Since, on upward movement of one spring and of the axle end connected to it there is simultaneous downward movement of the other spring, and of the axle connected to it, it follows that the axle oscillates about a point intermediate its ends. In effect, it is suspended at a single point and the same results are obtained as regards body motion as if there were a single, central suspension point. In other words, opposite sides of the chassis receive the same support regardless of the vertical position of the wheels so that in theory there will be no rocking of the body about the longitudinal axis of the chassis, and in practice there will be very little even on an extremely rough road. If one spring should receive a shock sufficient to break both springs the lever connected to it will strike the adjacent cam and its movement will be stopped before it can transmit movement sufficient to cause destructive deflection of the other spring.

The result obtained is a great increase in the riding qualities of the vehicle and an almost complete absence of side sway and lateral rocking. Owing to the fact that the wheels are pressed substantially uniformly against the road at all times the driving force is divided substantially equally between them and the differential gear becomes idle a great part of the time and is relieved of the shocks due to sudden changes of speed arising from unequal wheel pressure. These shocks are, of course, felt by the transmission and by the engine and their elimination, therefore, reduces, what may be termed, the abusive wear of the whole mechanical equipment. A reduction of tire wear is effected by the same means and for the same reasons. Owing to the increased quality of driving effort in the two rear wheels the front wheels and steering gear are relieved of stress and the effect of the brakes is more positive; also the efficiency of the engine as a brake is increased. It will thus be seen that the whole organization of the car benefits directly and indirectly.

The foregoing description of the operation has been given especially with reference to Figs. 1 to 4 of the drawings. The operation of the modification, shown in the remaining figure, is so similar that only the briefest description is necessary. Upward swing of the lever 114 revolves the shaft 117 and oscillates the cam 119 which engages and oscillates the cam 122. This cam oscillates the cam 121 which engages the cam 120 on the shaft 118 so that this shaft is revolved in the opposite direction to the shaft 117 and swings the lever 115 downwardly. It will be seen from an examination of Figs. 7 and 8 that the angular movement of the shaft 118 will be greater than the angular movement of the shaft 117 for the reasons and with the results already described, and that by using cams of different profiles the varying operative effects previously described may be produced with this modification of the device. While there is considerable difference in the appearance of the two forms of the device it will be seen that there is, in reality, no difference beyond a transposition of the parts necessary to bring the shafts from parallelism into alinement. Although one form has been referred to as a modification it must be understood that there is no preference for one or the other the differences being necessitated by different vehicle designs and duties.

It has been stated that the action of the cams is similar to the action of a gear pair in reversing the direction of the shafts. In other respects there is no similarity. A gear pair gives uniform ratio of angular movement between the shafts, whereas, the present arrangement gives a fixed or varying ratio of angular movement according to the cam profiles adapted. A gear pair would not give the levers any free-play as is the case in this device. It will be clearly seen that the levers are always free to drop so that in the case of the unloaded spring the wheel and spring tend to drop away from the chassis frame, i. e., the natural movement is in the direction imposed by the operation of the cams. This reduces the wear on the cam faces but in the case of gears would produce wear on one side of each tooth and tend to develop a large backlash. Obviously the faces of the cams will be curved to insure, as much as possible, rolling and not sliding contact between the cams to prevent friction and wear.

If the shafts 17 and 18 or 117 and 118 are made of spring steel so as to yield slightly to the torsion stress set up in them the shafts will act as a shock absorber to actually relieve the springs. Otherwise the device acts as a shock absorber only in that it enables one spring to absorb shocks from the other spring.

Obviously the center of axle oscillation will be, and remain, exactly midway between the axle ends only when cams are used which maintain a uniform 1:1 ratio between the shaft movements. When the cams used produce movement ratios other that 1:1, the center of axle oscillation will be located slightly out of the medial point and will be stationary or shifting according as the movement ratios are constant or varying. The maximum difference between possible oscillation centers is very slight and no difference in operation is observable, so that for all practical purposes the center of oscillation may be regarded as fixed midway between the axle ends.

Having thus described my invention, what I claim is:—

1. In a device of the class described, the combination with a chassis frame and springs, of a lever at each side of the frame pivotally mounted at one end on the frame and connected at its opposite end to the adjacent spring, and a connection between said levers, arranged to impose movement in opposite direction upon said levers.

2. A device according to claim 1, in which the connection is adapted to transmitting movement from either lever to vary the ratio of the angular movements of the levers.

3. A device according to claim 1, in which the connection comprises a pair of shafts rigidly connected to the levers, and cams carried by the shafts engaging one another.

4. A device according to claim 1, in which the connection comprises a cam rigidly connected to each lever, a second cam for each of said cams in engagement therewith, and operative connection between said second cams.

5. A device according to claim 1, in which the connection comprises a shaft rigidly connected to each lever, a cam rigidly connected to each shaft, and a second cam in engagement with each of the first cams, said second cams being operatively connected.

6. In vehicle construction the combination with a chassis frame and an axle suspended at its ends from the chassis frame, of means for oscillating said axle about a point intermediate its ends.

7. In a device of the class described, the combination with a chassis frame, springs and axle connected at its ends to said springs, of shafts rotatable by the flexion of one spring to flex the other spring until the load is equal in two springs.

8. In a device of the class described, the combination with a chassis frame, springs, axle and wheels, of means operative by increased upward pressure on one wheel to press the other wheel downwardly until the pressure exerted on the two wheels is equal, said means including rotatable shafts gearing one with the other.

9. A device according to claim 1, in which the connection is resilient.

10. A device according to claim 1, in which the connection comprises a shaft resilient under torsional stress rigidly secured to each lever, a cam rigidly connected to each shaft and a second cam operatively engaging each of the first cams, said second cams being operatively connected.

11. A device according to claim 1, in which the connection is adapted to vary the rate of load transference from spring to spring.

12. In combination with a device according to claim 7 means for limiting the load transference between springs and flexion caused thereby within the strength of the springs.

In witness whereof, I have hereunto set my hand.

JAMES O. TWINBERROW.